US007520451B2

(12) United States Patent
Capelle, Jr.

(10) Patent No.: US 7,520,451 B2
(45) Date of Patent: Apr. 21, 2009

(54) SPIKED AXISYMMETRIC NOZZLE AND PROCESS OF USING THE SAME

(75) Inventor: William Edward Capelle, Jr., Gulfport, MS (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/315,571

(22) Filed: Dec. 22, 2005

(65) Prior Publication Data

US 2006/0175441 A1 Aug. 10, 2006

Related U.S. Application Data

(60) Provisional application No. 60/640,139, filed on Dec. 29, 2004.

(51) Int. Cl.

| | |
|---|---|
| ***B02C 19/06*** | (2006.01) |
| ***B02C 1/00*** | (2006.01) |
| ***B65G 51/18*** | (2006.01) |
| ***B65G 53/50*** | (2006.01) |

(52) U.S. Cl. .............................. 241/5; 241/39; 406/144; 406/194

(58) Field of Classification Search ..................... 241/5, 241/39; 406/144, 194, 38, 92, 39
See application file for complete search history.

(56) References Cited

U.S. PATENT DOCUMENTS

| | | | | |
|---|---|---|---|---|
| 3,178,121 | A | 4/1965 | Wallace, Jr. | |
| 4,416,421 | A | 11/1983 | Browning | |
| 4,567,960 | A | 2/1986 | Johnson et al. | |
| 4,860,959 | A | 8/1989 | Handleman | |
| 6,951,312 | B2 * | 10/2005 | Casalmir et al. | 241/39 |
| 2004/0016835 | A1 | 1/2004 | Casalmir et al. | |
| 2004/0169098 | A1 | 9/2004 | Olson | |
| 2007/0102546 | A1 | 5/2007 | Capelle | |

OTHER PUBLICATIONS

Webster's Ninth New Collegiate Dictionary, p. 397 and 805 (1986).
"Linear Aerospike Engine" http://www.eng.fsu.edu/-shih/eml4421/students%20web%20pages/rocket%20propulsion/aerospike.htm.
"Aerospike Aerodynamics" http://www.aerospaceweb.org/design/aerospike/aerodynamics.shtml.

* cited by examiner

*Primary Examiner*—Faye Francis

(57) ABSTRACT

The embodiments of the present invention relate to a spiked axisymmetric nozzle for use in particle reduction processes where the spiked axisymmetric nozzle contains a nozzle plug thereby forming a fluid compression orifice for accelerating a grinding fluid used in reducing the particle size of particulate matter.

14 Claims, 4 Drawing Sheets

SPIKED AXISYMMETRIC NOZZLE AND PROCESS OF USING THE SAME

CROSS-REFERENCE TO RELATED APPLICATIONS

This application claims the benefit of U.S. Provisional Application No. 60/640,139, filed Dec. 29, 2004 incorporated by reference herein in its entirety.

FIELD OF THE INVENTION

The embodiments of the present invention relate to a spiked axisymmetric nozzle for use in fluid energy mills. In particular, the embodiments relate to a spiked axisymmetric nozzle containing a nozzle plug thereby forming a fluid compression orifice for accelerating a grinding fluid used in reducing the particle size of particulate matter.

BACKGROUND OF THE INVENTION

Fluid energy mills are used to reduce the particle size of a variety of materials such as, inter alia, pigments, agricultural chemicals, carbon black, ceramics, minerals and metals, pharmaceuticals, cosmetics, precious metals, propellants, resins, toner and titanium dioxide. The particle size reduction typically occurs as a result of particle-to-particle collisions, as generally, a fluid energy mill contains no moving parts. The fluid energy mill typically comprises a hollow interior that acts as a grinding chamber where the particle collisions occur. Within the grinding chamber, a vortex is formed via the introduction of compressed gases through fluid nozzles or Micronizers® positioned in an annular configuration around the periphery of the grinding chamber. The compressed gas (e.g. air, steam, nitrogen etc.), when introduced into the grinding chamber, forms a high-speed vortex as the gases travel within the grinding chamber. The gases circle within the grinding chamber at a decreased radii until released from the grinding chamber through a gas outlet. The particles to be ground are deposited within the grinding chamber and swept up into the high-speed vortex, thereby resulting in high speed particle-on-particle collisions as well as collisions with the interior portion of the grinding chamber walls. Typically the heavier the particle, the longer its residence time within the vortex and conversely the lighter particles (i.e. those sufficiently reduced particles) move with the vortex of gas until the outlet is reached. Typically, fluid energy mills are capable of producing fine (<10 microns) and ultra fine (<5 microns) particles.

Typical nozzles in the art that have found use include DeLaval nozzles (converging-diverging nozzles) through which the grinding gases (a.k.a. compression gases) are injected into the grinding chamber. In such nozzles the grinding occurs at the boundary between the particles and the high velocity grinding gas, also referred to as the shear zone. However, these types of nozzles are disadvantageous because the pattern of the gas as it exits the nozzle results in a substantial core of the gas stream flow to be unavailable for grinding because the particles cannot penetrate the fluid flow into the core. As a result, a greater amount of energy is necessary and a greater volume of compression gas is required to grind the particulate matter to the desired particle size.

Another disadvantage, with respect to fluid energy mills typically found within the art, is that they consume a significant amount of resources including energy and grinding gas due to the particular nozzles used therein.

Thus, there is a need within the industry for a mechanism for reducing energy and compression gas consumption as well as increasing the surface area of the fluid boundary useable for grinding particulate matter.

SUMMARY OF THE INVENTION

Briefly described, embodiments of the present invention generally relate to a nozzle plug, which when utilized in a spiked axisymmetric nozzle form a fluid acceleration region. Typically the spiked axisymmetric nozzle is used in the operation of a fluid energy mill.

An embodiment of the nozzle plug includes a means for securing the nozzle plug to the cylindrical member (e.g. preferably a second cylindrical portion), a first cylindrical portion connected with the means for securing the nozzle plug to the cylindrical member, and a ramped portion connected with the first cylindrical portion, where these components preferably form a unitary structure. The insertion of the nozzle plug into the cylindrical member forms a fluid acceleration region including a fluid compression orifice defined by the ramped portion of the nozzle plug and a cowl lip of the first wall of the cylindrical member.

Another aspect of the present invention contemplates the insertion of the nozzle plug into a cylindrical member, thereby forming a spiked axisymmetric nozzle for use in a fluid energy mill.

Another aspect of the present invention contemplates a method for reducing the size of particulate matter by delivering a particulate matter feed stream to the tip of the spiked axisymmetric nozzle; while also supplying a grinding fluid to the spiked axisymmetric nozzle, wherein the particulate matter breaks or becomes fragmented at the intersection of the two fluid streams.

Other processes, methods, features and advantages of the embodiments of the present invention will be or become apparent to one skilled in the art upon examination of the following drawings and detailed description. It is intended that all such additional processes, methods, features and advantages be included within this description, be within the scope of the present invention, and be protected by the accompanying claims.

BRIEF DESCRIPTION OF THE DRAWINGS

Many aspects of the embodiments of the present invention can be more fully understood with reference to the following drawings. The components set forth in the drawings are not necessarily to scale. Moreover, in the drawings, the reference numerals designate corresponding parts throughout the several views.

DETAILED DESCRIPTION

Figure 1A:
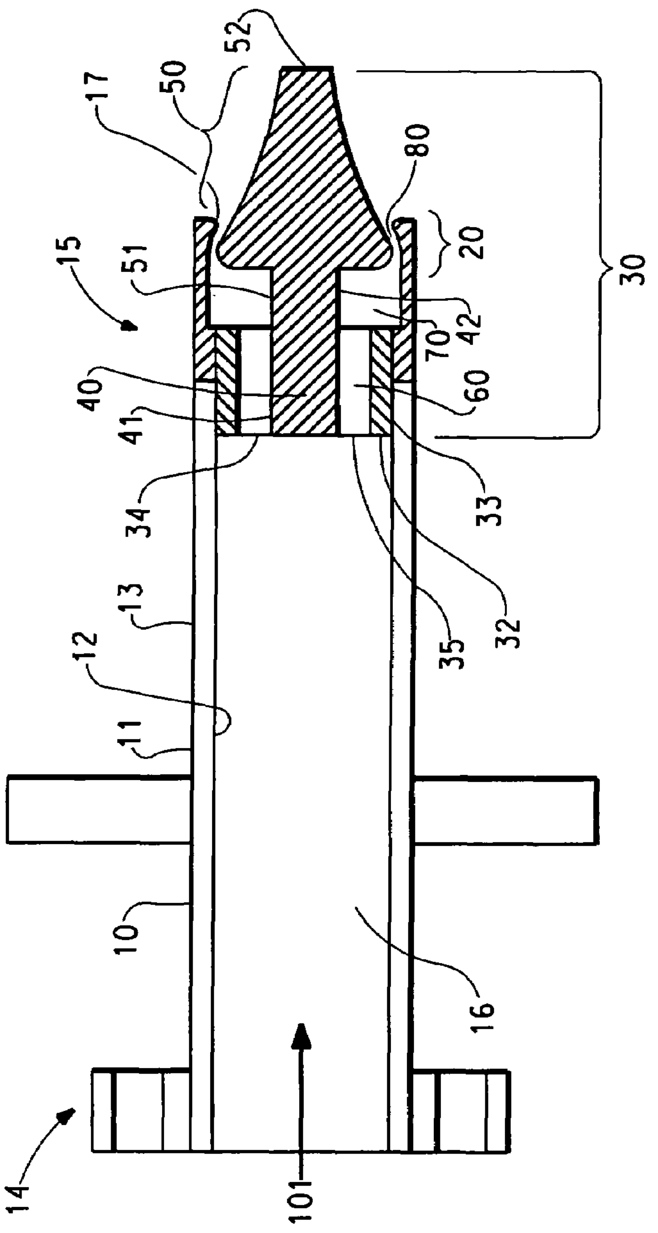
FIG. 1A shows a cross-sectional side view of an embodiment of a spiked axisymmetric nozzle.

The embodiments of the present invention relate to a spiked axisymmetric nozzle comprising a nozzle plug to form a fluid acceleration region for increasing the velocity of a grinding fluid to allow for particle size reduction. The spiked axisymmetric nozzle embodiments provide a fluid velocity (or fluid acceleration) that is greater than that found with other types of nozzles (e.g. DeLaval nozzles). Thus, the embodiments of the present invention result in a high velocity fluid flow (e.g. supersonic velocities) having a reduced core portion of the fluid flow, thereby subjecting the particulate matter to a shear zone. Preferably, the spiked axisymmetric nozzle is capable of providing an increased fluid velocity, a greater fluid surface area having the higher velocity, and a reduction in the energy consumption of a fluid energy mill.

The embodiments of the present invention may be utilized in the particle size reduction (a.k.a. grinding) of a wide variety of particulate matter. Non-limiting examples of suitable types of particulate matter include pigments, agricultural chemicals, carbon black, ceramics, minerals and metals, pharmaceuticals, cosmetics, precious metals, propellants, resins, toner and titanium dioxide. Grinding combinations of a variety of particulate matter may also be performed. Typically, the particulate matter is entrained in a fluid feed stream, which may be compressed air or other gas or a combination of gases.

The operation of a fluid energy mill includes the use of a grinding fluid (101) passing through the fluid acceleration region of the embodiments of the present invention. The grinding fluid (101) may comprise a single fluid or a combination of fluids thereby forming a composite fluid stream. The combinations of fluids and the proportions of each fluid therein may be varied to meet the necessary parameters for the particular grinding application.

Non-limiting examples of grinding fluids include air, nitrogen, steam and combinations thereof, wherein steam is preferred. Composite fluid streams may comprise steam and a second gas or other combination of gases.

Typically the grinding fluid (101) is delivered at a particular temperature and pressure, which is dependent upon the grinding fluid (101) utilized where such parameters are known by those skilled in the art. For example, steam is often heated to a temperature ranging from about 220° C. to about 340° C., preferably ranging from about 260° C. to about 305° C. prior to delivery into the spiked axisymmetric nozzle. Preferably it is supplied at a pressure of about 2.584 MPa (375 psi) to about 3.446 MPa (500 psi), more preferably ranging from about 2.687 MPa (390 psi) to about 3.032 MPa (440 psi). Computer models have shown that an embodiment of a spiked axisymmetric nozzle operated at the above-described parameters would result in the grinding fluid having a velocity (when measured at the point of discharge from the spiked axisymmetric nozzle) of up to about Mach 6.8.

The embodiments of the present invention contemplate a spiked axisymmetric nozzle (1) comprising:

(a) a cylindrical member (10) comprising a first wall (11) having an inner face (12) and an outer face (13), and a first end (14) and a second end (15), thereby defining a hollow interior (16), wherein the first wall (11) has a cowl lip (17) configuration at its second end (15); and (b) a fluid acceleration region (20) of the second end (15) of the cylindrical member (10) comprising:

(i) a nozzle plug (30) (which is inserted into the second end of the cylindrical member) comprising a means for securing the nozzle plug to the cylindrical member, a first cylindrical portion (40) connected to the means for securing the nozzle plug to the cylindrical member, the first cylindrical portion having an upstream end (41) and a downstream end (42), and a ramped portion (50) connected with the downstream end (42) of the first cylindrical portion (40), the ramped portion having a proximal end (53) and a distal end (54), and (ii) a fluid compression orifice (80) defined by the ramped portion (50) of the nozzle plug (30) and the cowl lip (17) of the first wall (11).

The components (e.g. the cylindrical member, nozzle plug etc.) of the present invention may be constructed of any materials capable of withstanding the temperatures, forces and pressures generated and encountered during normal operation of a fluid energy mill. Typically the cylindrical member (10) may be machined or constructed of materials such, as for example, solid bar stock or heavy walled pipe (e.g. Schedule 40, 80 or 160 pipe, which are known by those skilled in the art). The nozzle plug (30) is typically constructed of any metallic material or cast from ceramic materials. Preferably, the nozzle plug (30) is constructed of a rust resistant material such as, for example, stainless steel.

The cylindrical member (10) acts as a conduit to introduce the grinding fluid into the manifold (102) or grinding chamber of the fluid energy mill, such that the grinding fluid (101) flows past the nozzle plug (30). The cylindrical member (10) may be of any size known in the art to be suitable for use with fluid energy mills. Typically as the diameter of the cylindrical member (10) increases, the surface area of the grinding fluid jet (area available for grinding) also increases, thus resulting in a better shear zone (a greater grinding surface area).

The cylindrical member (10) comprises a first wall (11) having both an inner face (12) and an outer face (13); as well as a first end (14) and a second end (15) thereby defining a hollow interior (16) through which the grinding fluid (101) travels. The first end (14) is upstream of the second end (15) such that the grinding fluid (101) flow is generally away from the first end (14) and towards the second end (15).

The second end (15) of the cylindrical member (10) contains the fluid acceleration region (20) of the spiked axisymmetric nozzle (1), wherein the grinding fluid (101) is subjected to a fluid compression orifice; thereby accelerating the grinding fluid (101) to a high velocity as it exits from the spiked axisymmetric nozzle (1). The fluid compression orifice (80) is formed by the insertion of the nozzle plug (30) into the second end (15) of the cylindrical member (10) in conjunction with the cowl lip (17) of the first wall (11) of the cylindrical member (10).

The nozzle plug (30) comprises a means for securing the nozzle plug to the cylindrical member (e.g. a second cylindrical portion (31) as set forth below), a first cylindrical portion (40) and a ramped portion (50) ending in a truncated spike (52). Examples of various means for securing the nozzle plug to the cylindrical member include, but are not limited to, a second cylindrical portion (31) as further described herein, or fins, bars or arms (welded or otherwise connected to or formed in the first cylindrical portion) wherein such fins, arms or bars extend from the first cylindrical portion (40) to the inner face (12) of the first wall (11). The methods utilized to secure the nozzle plug within the cylindrical member should provide for the necessary stability and support such that the nozzle plug remains properly centered and non-fluttering so that during the normal operation of a fluid energy mill, the fluid compression orifice remains consistent over its area in terms of grinding fluid flow.

Figure 1B:
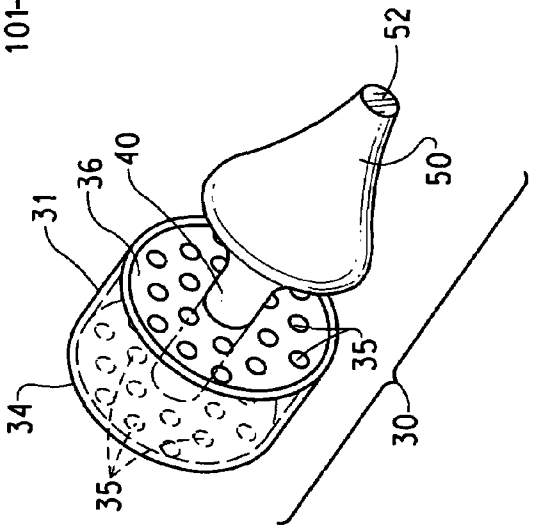
FIG. 1B shows an elevated side view of an embodiment of a nozzle plug.
Figure 2:
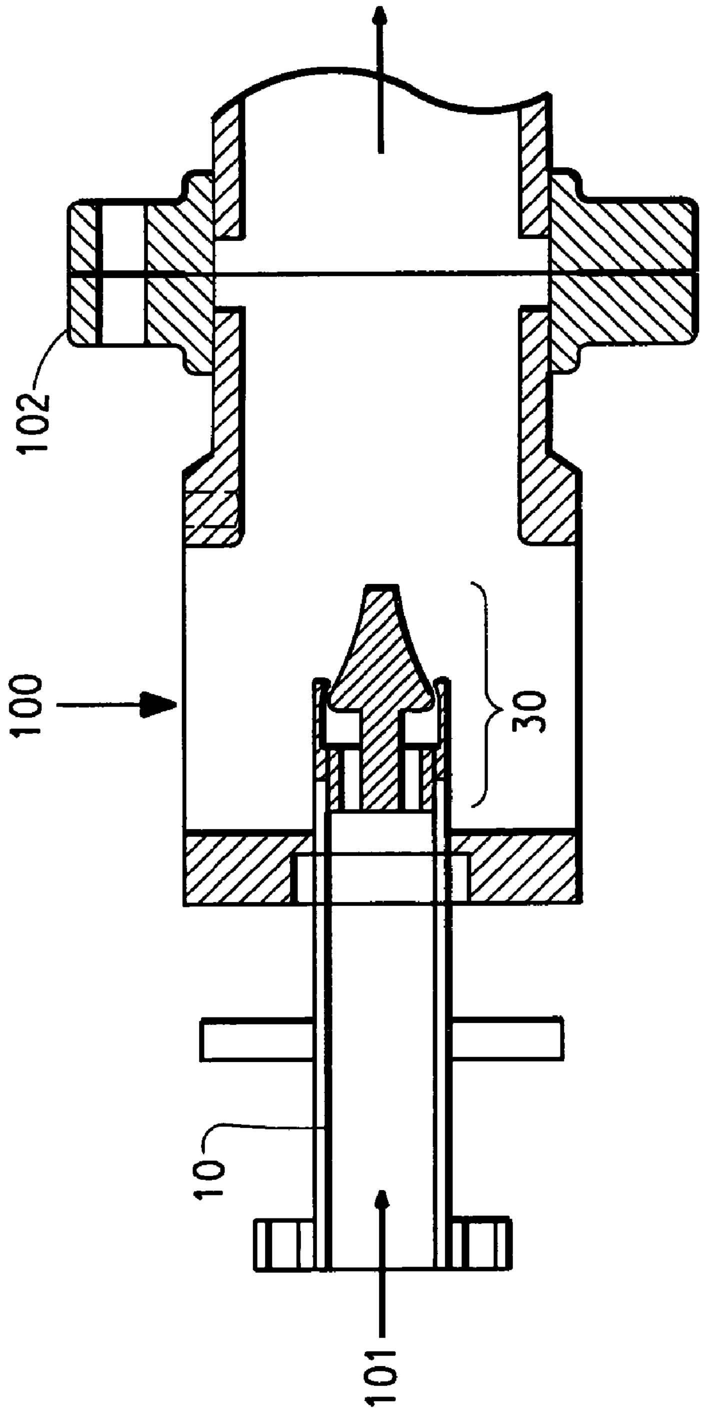
FIG. 2 shows a cross sectional side view of a portion of an embodiment of a spiked axisymmetric nozzle inserted into a manifold of a fluid energy mill.

A preferred example of a means for securing the nozzle plug to the cylindrical member is the use of a second cylindrical portion (31) (an embodiment of which is shown in FIGS. 1A and 1B) having a wall (32) whose outer surface (33) adjoins or is contiguous with the inner face (12) of the cylindrical member (10), thereby enabling the two components to be mounted or anchored to one another in a nested configuration. The two surfaces may be secured in adjoining positions using those techniques known to those skilled in the art for example including, but not limited to, welding (e.g. code welding or full penetration welding). The methods of welding to achieve sufficient connection strength for use with the temperatures and pressure associated with the operation of a fluid energy mill are known to those skilled in the art. The second cylindrical portion (31) comprises a floor (34) and an enclosing wall (36), each having at least one aperture (35) therethrough. The floor (34) acts as the point of attachment for the upstream end (41) of the first cylindrical portion (40). The first cylindrical portion (40) passes through the enclosing wall (36), which aids in providing the requisite structural integrity and stability to the entirety of the nozzle plug (30). The aperture(s) (35) allow for an even distribution of the grinding fluid (101) as well as its flow through the floor (34) and enclosing wall (36) and towards the fluid compression orifice (80). The aperture(s) (35) are of a number and size that may vary according to the viscosity of the grinding fluid, wherein as the viscosity of the grinding fluid deceases, the number of apertures to maintain the pressure drops increases, however, the aperture(s) used should not cause a drop in grinding fluid pressure outside the scope of that set forth below.

Preferably, there is no drop in pressure along the length of the cylindrical member from the point of grinding fluid introduction to the fluid compression orifice. However, a pressure drop may result as a consequence of the means for securing the nozzle plug to the cylindrical member, although the pressure drop is preferably not greater than 5%.

The first cylindrical portion (40) is connected with the second cylindrical portion (31) at its upstream end (41) and the ramped portion (50) at its downstream end (42), wherein a unitary structure is formed. The second cylindrical portion (31), first cylindrical portion (40) and ramped portion (50) may be originally formed as a unitary structure, or alternatively, may be individual pieces that are welded together to form a single piece. The first cylindrical portion (40) is not limited to any particular diameter or length so long as the requisite level of stability and structural integrity is conferred to the entirety of the nozzle plug (30).

The ramped portion (50) of the nozzle plug (30) is hyperbolic in shape, comprising a proximal end (53) and a distal end (54), wherein the ramped portion decreases in diameter in the downstream direction until it ends in a truncated spike (52).

Typically, the curve of the ramped portion (50) is such that the initial entrance is on a tangent about 45 degrees (the angle at which the grinding fluid exits the fluid compression orifice) from the central nozzle axis and then tapers to various lengths, although the tangent angle may vary such that for example it may measure 35 degrees.

With respect to the truncated spike, it creates turbulence in the fluid flow, thereby generating a lift to the flow and directing it towards the outside of the nozzle flow. Preferably the length of the ramped portion is 2.5 times the diameter of the ramped portion as measured at its widest point.

The fluid compression orifice (80), preferably an annular orifice, serves to accelerate the grinding fluid (101) as a constant volume of grinding fluid entering the spiked axisymmetric nozzle must exit through the restrictive fluid compression orifice (80). Typically, the annular area of the fluid compression orifice (80) is up to about 60% of the area of a throat cross section of a similar DeLaval nozzle. The fluid compression orifice (80) is formed by the proximal end (53) of the ramped portion (50) and a cowl lip (17) formed at the second end (15) of the first wall (11). The fluid compression orifice (80) should be sized with the equivalent ratio of a DeLaval jet. Preferably, the fluid compression orifice width is about 10 times longer than the gap.

For example, a typical DeLaval nozzle (having a throat diameter of 2 inches) has a fluid compression orifice area of about 1 sq.in. However an embodiment of the present invention having the same equivalent grinding (rate/product) as the DeLaval nozzle generally has a fluid compression orifice total area that is about 60% of the measured area found in the DeLaval nozzle and flows about 40% less compression fluid. The area of the fluid compression orifice may vary according to the desired flow rate of the grinding fluid and the type of product undergoing particle size reduction.

The embodiments of the present invention may further be coated with an abrasion resistant coating such as aluminum oxide, or chrome oxide or zirconia or mixtures thereof or one or more high performance thermoplastic materials to prevent clogging or agglomeration at the spiked axisymmetric nozzle tip (103) when sticky particulate matter is being ground. Any suitable high performance thermoplastic material can be used. Examples, without limitation, of such thermoplastic materials include polyetheretherketone and polybenzimidazole. Other commercially available materials that might be useful would include Kevlar® brand para aramid fiber or Nomex® brand fiber or sheet sold by E.I. du Pont de Nemours and Company of Wilmington, Del.

Typically the spiked axisymmetric nozzle (1) is operated by the introduction of grinding fluid (101) into the first end (14) of the cylindrical member (10) at velocities that vary greatly depending upon the type of grinding fluid (101), the pressure at which it is used during normal operation, and the amount of grinding energy required to reach a particular particle size. The grinding fluid (101) travels along the major nozzle axis until it encounters the means for securing the nozzle plug to the cylindrical member. For example, when the preferred second cylindrical portion (31) is used, the fluid flows through the at least one aperture (35) in the floor (34) and enclosing wall (36) and proceeds through the remainder of the spiked axisymmetric nozzle until it reaches the fluid compression orifice (80). As the grinding fluid (101) passes through the fluid compression orifice (80) it undergoes severe acceleration, increasing its velocity from substantially its initial introduction velocity to supersonic velocities. The high velocity compressed fluid provides for the particle-to-particle collisions necessary for a reduction in their particle size.

As the grinding fluid (101) moves through the spiked axisymmetric nozzle (1) its velocity increases until its maximum velocity is reached as the compressed fluid exits the spiked axisymmetric nozzle (1). The grinding fluid (101) undergoes expansion as it exits the fluid compression region as a result of the truncated spike (52). The grinding fluid (101) expands radially and in an inward direction towards the major nozzle axis. The turbulent flow assists in causing the particle-to-particle collisions.

In one embodiment, the fluid energy mill has at least one spiked axisymmetric nozzle. In another embodiment, the fluid energy mill can have as many as 50 spiked axisymmetric nozzle placed about the fluid energy mill in a circular orientation. In one embodiment, a spiked axisymmetric nozzle may be placed equidistant from its two neighboring spiked axisymmetric nozzles. In another embodiment, a spiked axisymmetric nozzle may not be placed equidistant from its two neighboring spiked axisymmetric nozzles. In another embodiment, some spiked axisymmetric nozzles may be placed equidistant from their neighbors and other spiked axisymmetric nozzles may not be placed equidistant from their neighbors. In other embodiments, the range of the number of spiked axisymmetric nozzles is selected from the group consisting of 1 to 5, 1 to 10, 1 to 15, 1 to 20, 1 to 25, 1 to 30, 1 to 35, 1 to 40, 1 to 45, 1 to 50, 1 to 3, 4 to 6, 7 to 9, 10 to 12, 13 to 15, 16 to 18, 19 to 21, 22 to 24, 25 to 27, 28 to 30, 31 to 33, 34 to 36, 37 to 39, 40 to 42, 43 to 45, 46 to 48, and 49 to 50.

The embodiments of the present invention further contemplate a method of reducing the size of particulate matter comprising:

(1) supplying a grinding fluid (101) to a spiked axisymmetric nozzle (1), (2) delivering a particulate matter feed stream (100) containing a particulate matter to a tip of the spiked axisymmetric nozzle (103) having the grinding fluid (101) exiting therefrom; and (3) dispersing the particulate matter at an intersection of the grinding fluid and the particulate matter feed stream Typically, the particulate matter is entrained at the point of highest velocity, which is at the discharge area of the fluid compression orifice (80) (i.e. the tip of the spiked axisymmetric nozzle (103) (a.k.a. the plane at the exit of the nozzle)). The reduction in particle size generally occurs in the shear zone, which exists at the intersection or boundary between the particulate matter feed stream and the high velocity fluid exiting the spiked axisymmetric nozzle (1).

Figure 4:
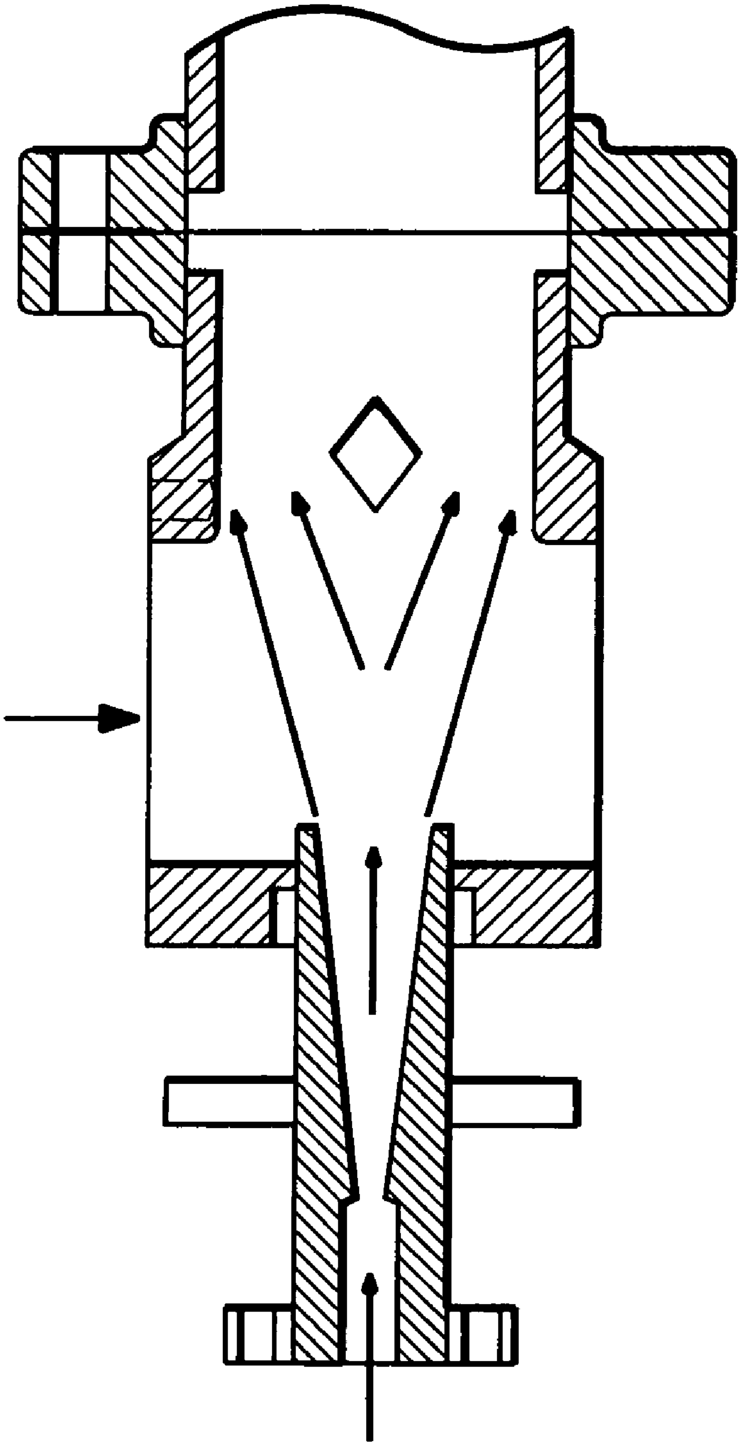
FIG. 4 (Prior Art)
FIG. 4 shows a cross-sectional side view of a standard nozzle found in the art and the fluid flow profile associated therewith.

As shown by FIG. 4, using standard nozzle technology results in a rapid expansion of the compressed fluid upon exiting the nozzle, wherein the decompressed fluid assumes a cone configuration such that the fluid fills substantially the entire pipe to the micronizers. The cone configuration is generally impenetrable by the particles carried in the particulate feed stream (100), thereby resulting in only limiting grinding capabilities. Moreover, the cone configuration results in only a limited boundary length between the particulate feed stream (100) and grinding fluid (101) stream being available for particle size reduction.

Figure 3:
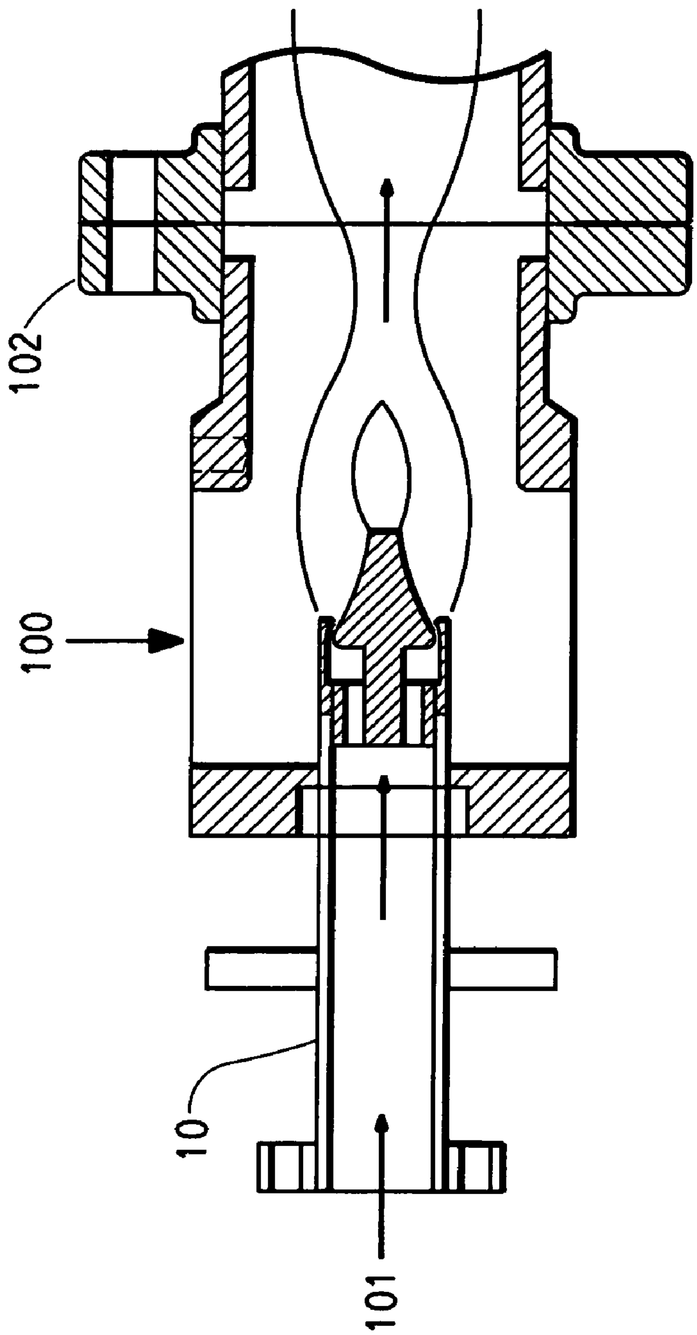
FIG. 3 shows a cross-sectional side view of an embodiment of a spiked axisymmetric nozzle and an example of a possible fluid flow profile associated therewith.

In contrast, the spiked axisymmetric technology of the embodiments of the present invention provides for a fluid flow such that when the fluid exits the spiked axisymmetric nozzle (1) there continues to be a shear zone available for particle size reduction. One example of a possible fluid flow found in conjunction with the use of an embodiment of the present invention is shown in FIG. 3.

In addition, the increased size of the shear zone surface area translates into the need to utilize a smaller volume of grinding fluid (101) to achieve the same result seen with standard nozzles within the art. Thus, the embodiments of the present invention allow a fluid energy mill to perform more efficiently such that less energy is consumed in the production of the same volume of fine or ultra-fine particles as those nozzles currently founding the art. The overall effect of the embodiments of the present invention is an increase in grinding efficiency.

What is claimed is:

1. A spiked axisymmetric nozzle comprising:

(a) a cylindrical member comprising a first wall having an inner face and an outer face, and a first end and a second end, thereby defining a hollow interior, wherein the first wall has a cowl lip configuration in the second end; and (b) a fluid acceleration region of the second end of the cylindrical member comprising:

i. a nozzle plug comprising a means for securing the nozzle plug to the cylindrical member, a first cylindrical portion connected with the means for securing the nozzle plug to the cylindrical member, the first cylindrical portion having an upstream end and a downstream end, and a ramped portion having a proximal end and a distal end, where the proximal end is connected with the downstream end of the first cylindrical portion, and ii. a fluid compression orifice defined by the ramped portion of the nozzle plug and the cowl lip wherein the means for securing the nozzle plug to the cylindrical member comprises a second cylindrical portion having a wall with an outer surface, a floor, and at least one aperture therein, wherein the upstream end of the first cylindrical portion is connected to the floor of the second cylindrical portion and the outer surface of the second cylindrical portion is contiguous with the inner face of the first wall.

2. The spiked axisymmetric nozzle of claim 1, wherein the length of said ramped portion is 2.5 time the diameter of said ramped portion as measured at its widest point.

3. The spiked axisymmetric nozzle of claim 1, wherein said fluid compression orifice width is about ten times longer than said fluid compression orifice gap.

4. The spiked axisymmetric nozzle of claim 1, wherein said spiked axisymmetric nozzle is coated with an abrasion resistant coating.

5. The spiked axisymmetric nozzle of claim 4, wherein said abrasion resistant coating is selected from the group consisting of aluminum oxide, chrome oxide, zirconia and mixtures thereof.

6. The spiked axisymmetric nozzle of claim 4 wherein said abrasion resistant coating is selected from the group consisting of at least one high performance thermoplastic.

7. The spiked axisymmetric nozzle according to claim 1, wherein the fluid compression orifice is an annular orifice.

8. A nozzle plug for a spiked axisymmetric nozzle, the nozzle having a cylindrical member comprising a first wall having an inner face and an outer face, and a first end and a second end, thereby defining a hollow interior, wherein the first wall has a cowl lip configuration in the second end, the nozzle plug comprising:

(i) a means for securing the nozzle plug to the cylindrical member, a first cylindrical portion connected with the means for securing the nozzle plug to the cylindrical member, the first cylindrical portion having an upstream end and a downstream end, and a ramped portion having a proximal end and a distal end, where the proximal end is connected with the downstream end of the first cylindrical portion, and (ii) a fluid compression orifice defined by the ramped portion of the nozzle plug and the cowl lip wherein the means for securing the nozzle plug to the cylindrical member comprises a second cylindrical portion having a wall with an outer surface, a floor, and at least one aperture therein, wherein the upstream end of the first cylindrical portion is connected to the floor of the second cylindrical portion and the outer surface of the second cylindrical portion is contiguous with the inner face of the first wall.

9. A method of reducing the size of particulate matter comprising:

(1) providing a spiked axisymmetric nozzle comprising:

(a) a cylindrical member comprising a first wall having an inner face and an outer face, and a first end and a second end, thereby defining a hollow interior, wherein the first wall has a cowl lip configuration in the second end; and (b) a fluid acceleration region of the second end of the cylindrical member comprising:

(i) a nozzle plug comprising a means second cylindrical portion, for securing the nozzle plug to the cylindrical member, a first cylindrical portion connected with the second cylindrical portion means for securing the nozzle plug to the cylindrical member, the first cylindrical portion having an upstream end and a downstream end, and a ramped portion having a proximal end and a distal end, where the proximal end is connected with the downstream end of the first cylindrical portion the second cylindrical portion having a wall with an outer surface, a floor, and at least one aperture therein, wherein the upstream end of the first cylindrical portion is connected to the floor of the second cylindrical portion and the outer surface of the second cylindrical portion is continuous with the inner face of the first wall, and (ii) a fluid compression orifice defined by the ramped portion of the nozzle plug and the cowl lip (2) supplying a grinding fluid to the first end of the cylindrical member of the spiked axisymmetric nozzle, (3) delivering a particulate matter feed stream containing a particulate matter to a tip of the spiked axisymmetric nozzle having the grinding fluid exiting therefrom; and (4) dispersing the particulate matter of the particulate matter feed stream at an intersection of the grinding fluid and the particulate matter feed stream, wherein the particulate matter breaks or becomes fragmented at the intersection of the grinding fluid exiting the nozzle and the particulate matter feed stream.

10. The method of claim 9, wherein the particulate matter comprises at least one of pigments, agricultural chemicals, carbon black, ceramics, minerals and metals, pharmaceuticals, cosmetics, precious metals, propellants, resins, toner and titanium dioxide.

11. The method according to claim 9, wherein the grinding fluid comprises at least one of air, nitrogen and steam and combinations thereof.

12. The method as recited in claim 9, wherein said grinding fluid is steam, said steam heated to a temperature in the range of from about 220° C. to about 340° C., and wherein said steam is at a pressure of pressure of from about 2.584 MPa to about 3.446 MPa.

13. The method as recited in claim 12, wherein said temperature is in the range of from about 260° C. to about 305° C.

14. The method as recited in claim 12, wherein said steam is at a pressure of from about 2.687 MPa to about 3.032 MPa.

* * * * *